US006052113A

United States Patent [19]
Foster

[11] Patent Number: 6,052,113
[45] Date of Patent: Apr. 18, 2000

[54] METHODS AND APPARATUS FOR PROCESSING DATA VALUES REPRESENTATIVE OF AN IMAGE WITH EFFICIENT DITHER MATRICES

[75] Inventor: Bradly J. Foster, Fort Collins, Colo.

[73] Assignee: Hewlett-Packard Company, Palo Alto, Calif.

[21] Appl. No.: 08/865,755

[22] Filed: May 30, 1997

[51] Int. Cl.[7] .................................................. G09G 5/10
[52] U.S. Cl. .......................................... 345/149; 345/147
[58] Field of Search .................................... 345/149, 147, 345/430; 358/457, 298, 451; 709/208

[56] References Cited

U.S. PATENT DOCUMENTS

| | | | |
|---|---|---|---|
| 5,398,297 | 3/1995 | Clark et al. | 358/298 |
| 5,700,610 | 12/1997 | Bosschaerts et al. | 358/298 |
| 5,781,308 | 7/1998 | Fujii et al. | 358/451 |
| 5,809,217 | 9/1998 | Bunce | 358/298 |
| 5,831,624 | 11/1998 | Tarolli et al. | 345/430 |
| 5,878,216 | 3/1999 | Young et al. | 709/208 |

*Primary Examiner*—Steven J. Saras
*Assistant Examiner*—Alecia D. Nelson

[57] ABSTRACT

Data values representative of a source image are processed with a dither matrix having dither values corresponding to pixel locations in the source image. The dither matrix has dimensions n×n, where n is modulo 4 and an integer value m exists such that m·m=n. The dither matrix is typically a 4×4 matrix. The dither values are arranged in the dither matrix such that each row, column, diagonal and m×m submatrix in the dither matrix adds to substantially the same value, preferably the sum of all dither values in the dither matrix divided by n. A dither value corresponding to a pixel location is accessed in the dither matrix. An initial data value associated with the pixel location is combined with the accessed dither value, typically by adding, to provide an intermediate value. The intermediate value is clamped and truncated to provide a dithered data value. Where each pixel is represented by two or more data values, such as color values, a dither matrix is associated with each parameter. Preferably, the sum of the selected dither matrices is a matrix having matrix values that are substantially the same.

15 Claims, 4 Drawing Sheets

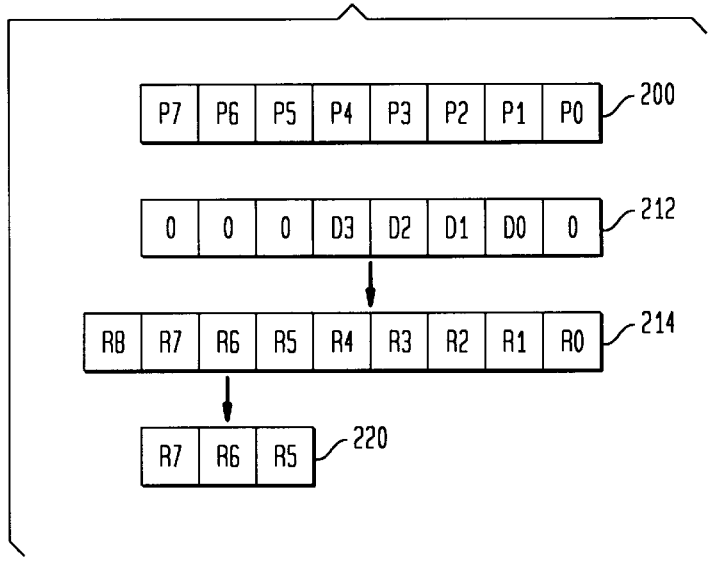

METHODS AND APPARATUS FOR PROCESSING DATA VALUES REPRESENTATIVE OF AN IMAGE WITH EFFICIENT DITHER MATRICES

FIELD OF THE INVENTION

This invention relates to computer graphics and image processing and, more particularly, to methods and apparatus for processing input data values with dither matrices to generate output data representative of an output image. The dither matrices are selected to avoid the Mach banding effect and to minimize perceivable intensity variations in the output image.

BACKGROUND OF THE INVENTION

Computer graphics systems commonly are used for displaying graphical representations of objects on a two-dimensional display screen. Current computer graphics systems can provide highly detailed representations and are used in a variety of applications.

In typical computer graphics systems, an object to be represented on a display screen is broken down into a plurality of graphics primitives. Primitives are basic components of a graphics picture, such as points, lines, vectors and polygons (e.g., triangles). Typically, a hardware/software scheme is implemented to render (draw) on a two-dimensional display screen, the graphics primitives that comprise a view of one or more objects.

A host computer commonly provides primitive data that represents the primitives of a three-dimensional object to be rendered. When the primitive is a triangle, for example, the host computer may define the triangle in terms of the x, y, z coordinates and the red, green, blue (R,G,B) color values of each vertex. Rendering hardware interpolates the primitive data to compute the display screen pixels that constitute each primitive, and the R,G,B color values for each pixel.

The basic components of a typical computer graphics system include a geometry accelerator, a rasterizer and a frame buffer. The geometry accelerator receives, from the host computer, vertex coordinate and color data for primitives that constitute an object. The geometry accelerator typically performs transformations on the vertex coordinate data (i.e., to screen space coordinates), decomposes quadrilaterals into triangles, and may perform other functions, such as lighting, clipping and performing plane equation calculations for each primitive. The output from the geometry accelerator, referred to as rendering data, is used by the rasterizer to compute final screen space coordinates and R,G,B color values for each pixel constituting the primitives. The final data is stored in the frame buffer for display on a display screen. Some graphics systems are pipelined such that various operations (such as transformations, interpolation, etc.) are performed simultaneously by different components on different object primitives.

In computer graphics, it is often desirable to reduce the precision of data at some point in the graphics pipeline. This may be necessary for final storage as 8 bits in the frame buffer, for example, when a 24-bit color value consisting of 8 bits of red, 8 bits of green and 8 bits of blue is reduced to 3 bits of red, 3 bits and green and 2 bits of blue for storage as 8 bits in the frame buffer. The number of bits may also be reduced after high precision operations are performed. For example, after rasterization at high precision (such as 24-bit precision), extra bits may be thrown away to reduce the data to eight bits per channel for downstream operations.

Simple truncation and rounding are undesirable due to Mach banding effects that are introduced into the final image. In the Mach banding effect, the intensity change at any edge where there is a discontinuity in magnitude or slope of intensity is exaggerated by the human eye. Mach banding is described, for example, by Foley and van Dam in *Computer Graphics, Principles and Practice*, Second Edition, Addison-Wesley, 1990, pp.735–736. To avoid the Mach banding effect, some form of dithering is often used to exploit spatial integration in the eye. Dithering is described in the aforementioned Foley and van Dam reference at pages 568–573. In the dithering operation, a dither value from a dither matrix is combined with a data value prior to truncation. The dither value varies with pixel location in the image. A problem with dithering is "hot spots" introduced by the dither matrix. The hot spots are seen as regions of increased intensity in the output image. It is desirable to provide methods and apparatus for dithering wherein hot spots are reduced or eliminated.

SUMMARY OF THE INVENTION

According to a first aspect of the invention, methods and apparatus are provided for processing data values representative of a source image. A dither matrix having dither values corresponding to pixel locations in the source image is stored. The dither matrix has dimensions n×n, where n is modulo 4 and an integer value m exists such that m·m=n. The dither values are arranged in the dither matrix such that each row, column, diagonal and m×m submatrix in the dither matrix adds to substantially the same value. The dither value corresponding to a pixel location is accessed in the dither matrix. An initial data value associated with the pixel location is combined with the accessed dither value, typically by adding, to provide an intermediate value. The intermediate value is clamped and truncated to provide a dithered data value. The steps of accessing the dither value, combining the initial data value with the accessed dither value and clamping and truncating the intermediate value are repeated for a selected number of pixels in the source image to provide dithered data values representative of an output image.

The dither values are preferably arranged in the dither matrix such that each row, column, diagonal and m×m submatrix in the dither matrix adds to the sum of all dither values in the matrix divided by n. In a preferred embodiment, the dither matrix has 4 rows and 4 columns, such that n is 4 and m is 2, has dither values ranging from 0 to 15, and each row, column, diagonal and 2×2 submatrix of the dither matrix adds to 30.

According to another aspect of the invention, methods and apparatus are provided for processing data values representative of a source image wherein two or more data values, representative of different parameters, are associated with each pixel of the source image. According to the method, dither matrices, one associated with each of the parameters, are stored. Each of the dither matrices has dither values corresponding to pixel locations in the source image. Each of the dither matrices has dimensions n×n, where n is modulo 4 and a integer value m exists such that m·m=n. The dither values in each of the dither matrices are arranged such that each row, column, diagonal and m×m submatrix adds to substantially the same value. The dither matrices are selected such that their sum is a matrix having substantially equal matrix values. For a pixel location having initial data values, the dither values in the dither matrices corresponding to the pixel location are accessed. The initial data values are combined with the corresponding accessed dither values to provide intermediate values. The intermediate values are clamped and truncated to provide dithered data values. The steps of accessing the dither values, combining the initial data values with the corresponding accessed dither values and clamping and truncating the intermediate values are repeated for a selected number of pixels in the source image to provide dithered data values representative of an output image.

The dither values are preferably arranged in the dither matrices such that each row, column, diagonal and m×m submatrix in each of the dither matrices adds to the sum of all dither values in the respective dither matrix divided by n. In a preferred embodiment, the dither matrix has four rows and four columns, such that n is 4 and m is 2, has dither values ranging from 0 to 15, and each row, column, diagonal and 2×2 submatrix in each of the dither matrices adds to 30.

In a first embodiment, red, green and blue color values are associated with each pixel location, and red, green and blue dither matrices are respectively associated with the red, green and blue color values. In a preferred embodiment wherein each of the dither matrices has four rows and four columns, the sum of the red, green and blue dither matrices is a matrix having matrix values of 22 or 23.

In a second embodiment, red, green, blue and alpha values are associated with each pixel location, and red, green, blue and alpha dither matrices are respectively associated with the red, green, blue and alpha values. In a preferred embodiment wherein each of the dither matrices has four rows and four columns, the sum of the red, green, blue and alpha dither matrices is a matrix having matrix values of 30.

BRIEF DESCRIPTION OF THE DRAWINGS

For a better understanding of the present invention, reference is made to the accompanying drawings, which are incorporated herein by reference and in which:

FIG. 2 illustrates an example of a dithering operation;

FIG. 3 illustrates a dither matrix which produces hot spots;

FIG. 4 illustrates a group of three dither matrices in accordance with the present invention;

DETAILED DESCRIPTION

Figure 1:
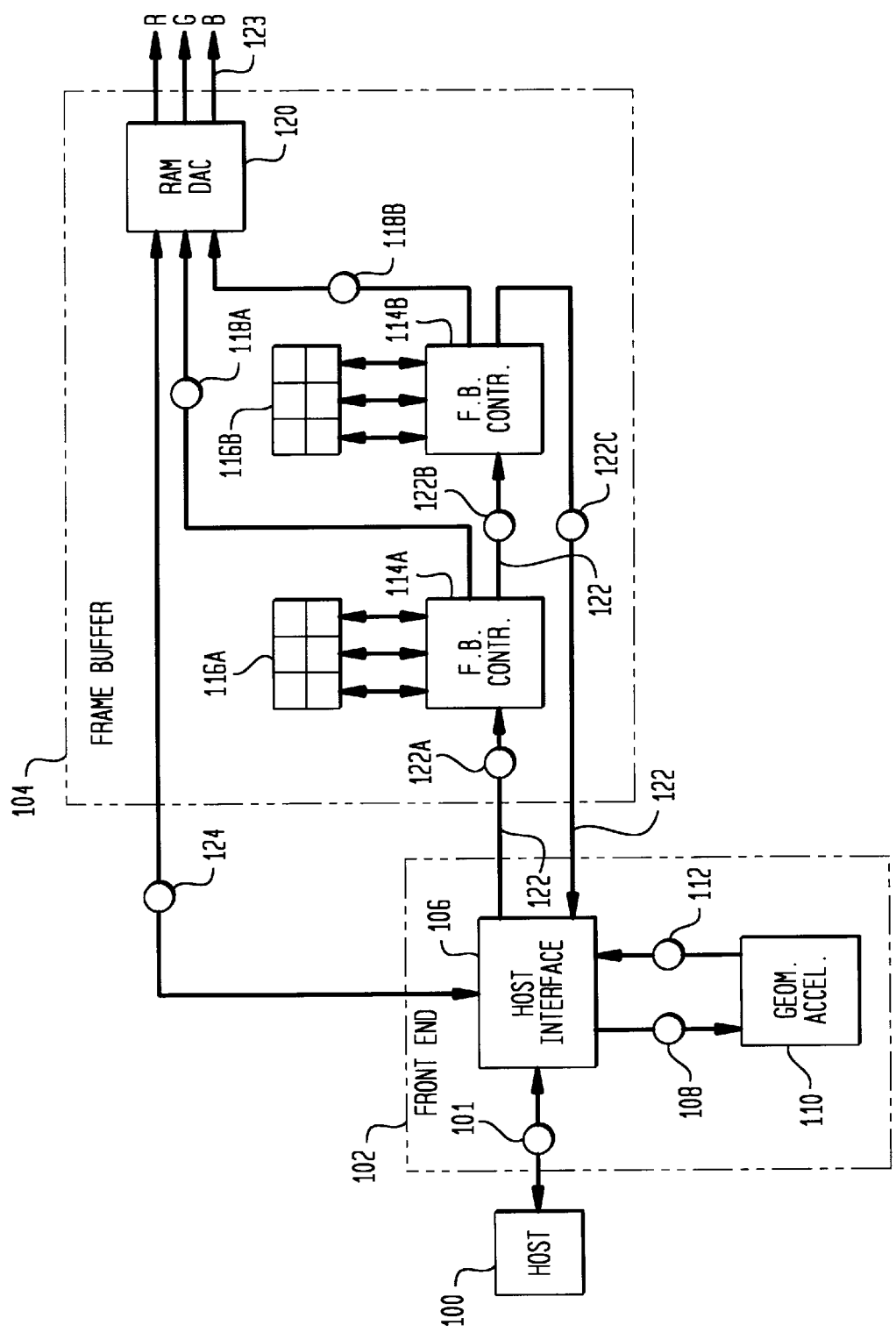
FIG. 1 is a block diagram of a computer graphics system suitable for incorporation of the present invention.

FIG. 1 is a block diagram showing an exemplary embodiment of a computer graphics system suitable for practice of the present invention. It should be understood that the system shown is exemplary and in no way limiting and that any computer graphics system or other similar system could utilize the dithering methods and apparatus of the invention.

The system of FIG. 1 includes a host computer 100, a front end subsystem 102 and a frame buffer subsystem 104. The front end subsystem 102 receives primitives to be rendered from the host computer 100 over bus 101. The primitives typically are specified by x, y, z coordinate data, R,G,B color data, and alpha blending data, for each of certain portions of the primitives, such as the triangle vertices.

Data representing the primitives in three dimensions is provided by the front end subsystem 102 to the frame buffer subsystem over bus 122, having segments 122A, 122B and 122C. The frame buffer subsystem 104 interpolates the rendering data received from the front end subsystem 102 to compute the pixels on the display screen that will represent each primitive, and to determine resulting object R,G,B color values for each pixel. R,G,B color control signals for each pixel respectively are provided over R,G,B lines 123 to control the pixels of the display screen (not shown) to display a resulting image thereon.

In the embodiment shown in FIG. 1, front end subsystem 102 includes a host interface 106 and a three-dimensional (3-D) geometry accelerator 110. As noted, host interface 106 receives the x, y, z coordinates and color primitive data along bus 101 from host computer 100. Such data is provided from host interface 106 to geometry accelerator 110 along bus 108. Geometry accelerator 110 performs conventional geometry accelerator functions resulting in rendering data for display. Such functions may include three-dimensional transformation, lighting, clipping, and perspective divide operations, as well as plane equation generation, done in floating point format. The rendering data is provided by geometry accelerator 110 along bus 112 to host interface 106 which re-formats the rendering data, performs a floating point to fixed point conversion, and provides such data along bus system 122 to frame buffer subsystem 104.

In this embodiment, frame buffer subsystem 104 includes two frame buffer controllers 114A and 114B, having respective synchronous graphics random access memories (SGRAM) 116A and 116B, as well as a random access memory digital-to-analog converter (RAMDAC) 120. Connected to the bus architecture 122 of the present invention are both frame buffer controllers 114A and 114B and host interface 106. In this embodiment, bus 122 includes three buses 122A, 122B and 122C, each identical to the other.

In the embodiment of FIG. 1, each frame buffer controller 114A and 114B receives rendering data from host interface 106. Each frame buffer controller may control different, non-overlapping segments of the display screen. The frame buffer controllers may interpolate the primitive data to compute the screen display pixel coordinates that represent the primitive, and the corresponding object R,G,B color values for each pixel coordinate.

The resulting image video data generated by the frame buffer controllers 114A and 114B, including R,G,B values for each pixel, may be stored in the corresponding SGRAM memories 116A and 116B. Video data may be read from the SGRAM chips, re-formatted so that it can be handled by RAMDAC 120, and provided to the RAMDAC. RAMDAC 120, in turn, may convert the digital color data to analog R,G,B color control signals for each pixel, which are provided along R,G,B lines 123 to control a screen display (not shown).

Host interface 106 also may communicate directly with RAMDAC 120 through video bus 124. The system preferably is a pipelined system such that frame buffer subsystem 104 may operate on a first primitive while front end subsystem 102 is operating on a subsequent (in time) primitive.

As indicated above, it is often desirable to reduce the precision of data in the graphics pipeline. This may be necessary for final storage in the frame buffer. A 24-bit color value consisting of 8 bits of red, 8 bits of green and 8 bits of blue may be reduced by the frame buffer controllers 114A and 114B to 3 bits of red, 3 bits of green and 2 bits of blue for storage as 8 bits in the frame buffer. The number of bits may be reduced after other operations in the computer graphics system. To avoid the Mach banding effect, dithering may be used to exploit spatial integration in the eye.

Dithering is described with reference to FIG. 2 in which an example of a dithering operation is shown. A data value such as color value 200 having 8 bits is to be reduced in precision to 3 bits. The color value 200 is associated with a particular pixel location in the image, which may be specified by (x,y) window coordinates. The x and y coordinates of the pixel are used to index a dither value in a dither matrix, an example of which is shown in FIG. 3. A dither matrix 210 has 4 rows and 4 columns in the example of FIG. 3, with dither values ranging from 0 to 15 in the cells of the dither matrix. It is to be noted that the dither matrix 210 shown in FIG. 3 has an undesirable arrangement of dither values and is given for illustrative purposes. Assuming that color value 200 has (x, y) coordinates of (1, 3), a dither value of 13 is accessed in dither matrix 210. The dither value is represented by a 4-bit binary code in the case of a 4×4 dither matrix having 16 dither values.

Referring again to FIG. 2, a dither value 212 is added to color value 200 to obtain an intermediate value 214. In performing the addition, the 4 bits of the dither value are placed in bit positions 4 through 7, counting from the left, relative to color value 200, because the color value 200 is being reduced to 3 bits. When the color value is being reduced to 2 bits, the dither value is placed in bit positions 3 through 6, counting from the left, relative to color value 200. More generally, when a data value is to be reduced in precision to r bits, the dither value is aligned for addition with the data value such that the most significant bit of the dither value is at the r+1 bit position, counting from the left. In the example of FIG. 2, the data value 200 is to be reduced in precision to 3 bits (r=3). In this case, the most significant bit D3 of the dither value is placed at the fourth bit position (r+1=4) from the left. Following the addition of the color value and the dither value, a clamping operation is performed. The clamping operation ensures that the intermediate value 214 does not exceed the maximum color value as a result of the addition of the dither value. Otherwise, the color value would change from maximum value to minimum value. Referring to FIG. 2, when an overflow bit R8 in the intermediate value 214 is a "1", indicating that the result of the addition exceeded the maximum value, the maximum allowable value is used. This has the effect of clamping the result of the dithering operation. Following clamping, intermediate value 214 is truncated to a final dithered color value 220 by dropping low order bits R4–R0 of intermediate value 214.

Referring again to FIG. 3, it can be seen that the dither value added to the color value in the dithering operation varies depending on the pixel location. The dithering operation has the effect of adding noise to the color values. Because of the spatial integration that occurs in the human eye, Mach banding effects are eliminated.

The dither matrix 210 of FIG. 3 is undesirable because it is heavily weighted toward the lower portion of the matrix. When the dither values in matrix 210 are added to color values in an image, hot spots, or regions of increased intensity, are produced in regions of the image corresponding to the lower part of the dither matrix 210. It is therefore desirable to perform dithering with dither matrices in which hot spots are reduced or eliminated.

Figure 5:
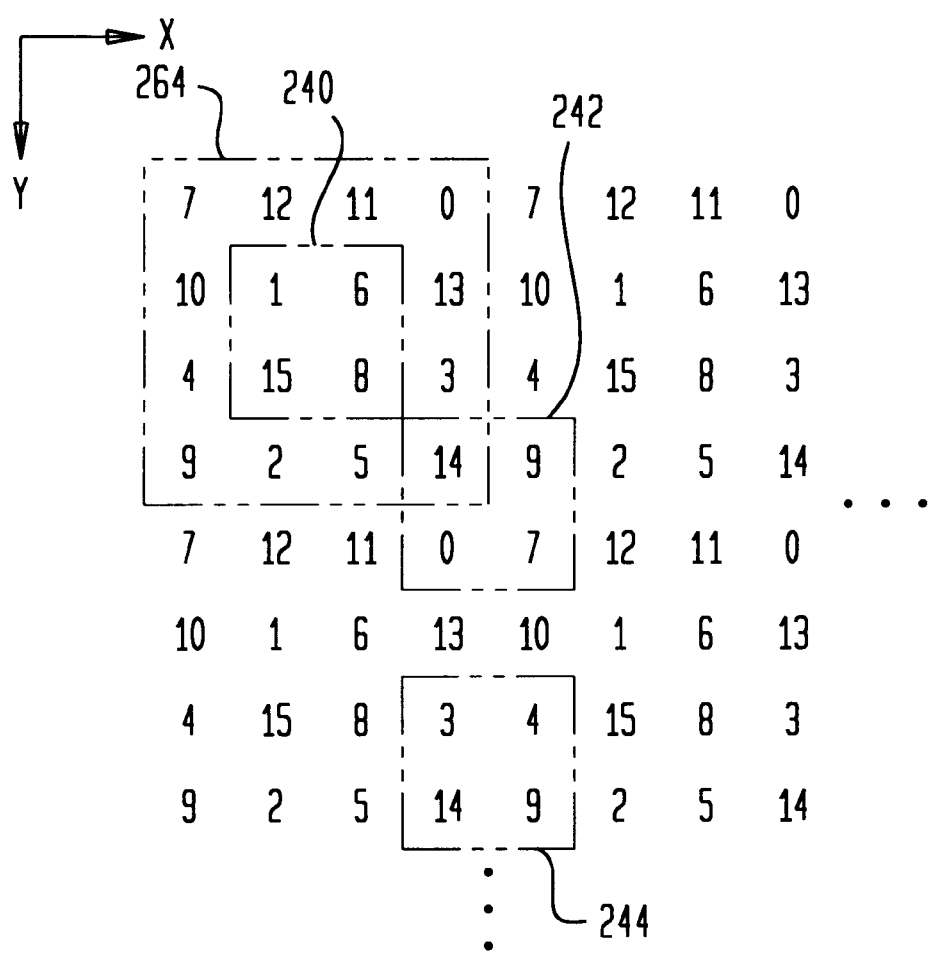
FIG. 5 illustrates a repeating dither matrix pattern.

It has been discovered that efficient dither matrices without hot spots may be obtained as follows. The 4×4 dither matrix typically has dither values ranging from 0 to 15. The sum of the dither values (15+14+13+. . . ) is 120. Dither matrices wherein each row, column, diagonal and 2×2 submatrix of the dither matrix adds to 30 ($120/4$) do not produce hot spots in the output image. Examples of such dither matrices are illustrated in FIG. 4. A 2×2 submatrix, also known as a quad, is defined as four adjacent dither values from two rows and two columns of the dither matrix. For example, quads 240, 242 and 244 are illustrated in FIG. 5.

Referring again to FIG. 4, it may be observed that each of the dither matrices 260, 264 and 268 meets the criteria set forth above. In particular, each row adds to 30, each column adds to 30, each diagonal adds to 30 and each 2×2 submatrix adds to 30. A computer program was written to identify all 4×4 dither matrices which meet the above criteria. A total of 384 was found, three of which are shown in FIG. 4.

It will be understood that dither matrices having different dimensions may be utilized and that different dither values may be utilized in the dither matrices. The criteria for dither matrices that do not produce hot spots in the output image may be stated more generally as follows. Square dither matrices having dimensions n×n, where n is modulo 4 and wherein an integer value m exists such that m·m=n, are used to avoid hot spots in the output image. Thus, for example, in the 4×4 dither matrix, n=4 and m=2. Using this criteria, it can be seen that the invention applies to dither matrices having dimensions of 4×4; 16×16; 36×36; 64×64; 100×100; etc. In these dither matrices, each row, column, diagonal and m×m submatrix adds to substantially the same value, and preferably adds to the sum of all dither values in the dither matrix divided by n. Thus, in the 4×4 dither matrix, each 2×2 submatrix meets this criteria.

A typical image is made up of several thousand pixels. As shown in FIG. 5, the selected dither matrix is repeated in x and y directions. In the example of FIG. 5, dither matrix 264 is repeated in x and y directions. It is further noted with reference to FIG. 5 that quads, or submatrices, which overlap boundaries between repeating dither matrices meet the criteria stated above. Thus, for example, quad 244, which overlaps two adjacent dither matrices, sums to 30. Furthermore, quad 242, which overlaps four adjacent dither matrices, sums to 30. As a result, the entire image is free of hot spots due to the dithering operation.

In the case of a gray scale image, a single data value is associated with each pixel location. In that case, a single dither matrix may be utilized as described above. However, in the case of a color image, three or more data values are associated with each pixel location. The data values include color values and may include an alpha value. A dither value is added to each color value, and the resulting intermediate values are clamped and truncated to provide final dithered color values. If the same dither matrix is used for each color value, regions of higher intensity may be generated in the output image, because all color components add at the same location. This may be understood with reference to FIG. 4. If dither matrix 260 is used for each color value, a dither value of 15 is added to each color value at pixel location (2,2), whereas a dither value of 0 is added to each color value at pixel location (0,0). Thus, all colors adding uniformly produces a region of highest intensity at pixel location (2,2).

In accordance with a further aspect of the invention, a dither matrix is selected for each color value or other data value. Each of the selected dither matrices individually meets the criteria stated above. In addition, the dither matrices are selected such that the sum of the dither values in each dither cell of the selected dither matrices is substantially the same. Mathematically, this may be stated as requiring that the sum of the selected dither matrices is a matrix having matrix values that are substantially the same. For a color image wherein each pixel is represented by red, green and blue color values, the dither values in each cell of the three selected 4×4 dither matrices (each having dither values ranging from 0 to 15) should add to (30/4)+(30/4)+(30/4)=22.5. Since fractional sums cannot be obtained with integer dither values, the best that can be achieved is to select a combination of three 4×4 dither matrices whose cells add to 22 or 23 for all 16 cells. A computer program was written to select groups of three dither matrices meeting this criteria. The dither matrices 260, 264 and 268 shown in FIG. 4 meet this criteria. Thus, for example, the dither values at pixel location (1,1) add to 22 (12+1+9) and the dither values at pixel location (3,1) add to 23 (5+13+5).

In some graphics systems, red, green, blue and alpha values are associated with each pixel location. In this instance, four dither matrices are selected to avoid regions of higher intensity. Ideally, the dither values in each cell of the four selected 4×4 dither matrices (each having dither values ranging from 0 to 15) should add to (30/4)+(30/4)+(30/4)+(30/4)=30. It is believed that this requirement can be relaxed somewhat without significantly degrading the quality of the output image.

It will be understood that when multiple data values are associated with each pixel location, the selection of dither matrices depends on the dimension of the dither matrices and the number of dither matrices required. In general, the sum of the dither values for each cell of the selected dither matrices should be substantially the same.

Figure 6:
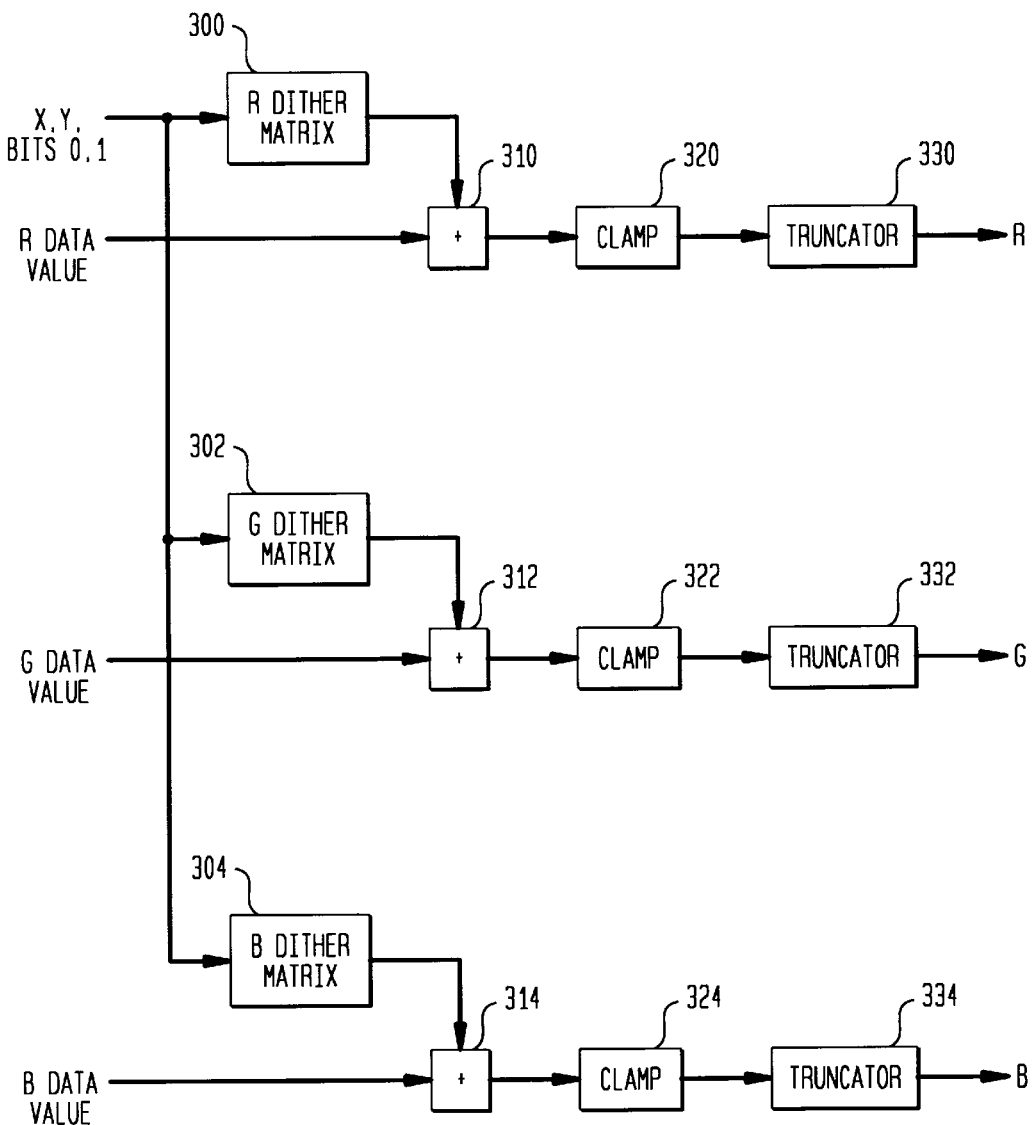
FIG. 6 is a block diagram of apparatus for dithering red, green and blue color values in accordance with the present invention.

An example of a circuit for performing dithering operation in accordance with the invention is shown in FIG. 6. A red dither matrix 300 may correspond to dither matrix 260 shown in FIG. 4, a green dither matrix 302 may correspond to dither matrix 264, and a blue dither matrix 304 may correspond to dither matrix 268. The dither matrices 300, 302 and 304 may be stored in one or more memory devices, such as RAM or ROM. Each dither matrix may be addressed by the low order bits of the pixel coordinates, since the dither matrix is repeated across the image. The output of red dither matrix 300 and a red data value are supplied to an adder 310. An intermediate value output by adder 310 is clamped by a clamp 320 and is truncated by a truncator 330 to provide a dithered red data value. Similarly, the output of green dither matrix 302 is combined with a green data value by an adder 312, and an intermediate value output by adder 312 is clamped by a clamp 322 and is truncated by a truncator 332 to provide a dithered green data value. Likewise, the output of blue dither matrix 304 is combined with a blue data value by an adder 314, and an intermediate value output by adder 314 is clamped by a clamp 324 and is truncated by a truncator 334 to provide a dithered blue data value. The operations performed by the circuit of FIG. 6 correspond to the operations shown in FIG. 2 and described above. Circuits for performing the individual functions shown in FIG. 6 are well known to those skilled in the art.

It will be understood that the number of bits in the color value or other data value may be varied within the scope of the present invention. Furthermore, the reduction in precision of the data value may be varied within the scope of the invention. Additionally, the dimension of the dither matrix and the number of data values associated with each pixel location may be varied within the scope of the invention. The invention generally provides methods and apparatus for processing data values by dithering, while reducing or eliminating hot spots and perceived intensity variations in an output image. While the invention is typically used in connection with graphics and image processing, it may be utilized in any dithering operation.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for processing data values representative of a source image wherein two or more data values, representative of different parameters, are associated with each pixel of the source image, comprising the steps of:

a) providing dither matrices, one associated with each of said parameters, each of said dither matrices having dither values corresponding to pixel locations in the source image, each of said dither matrices having dimensions n×n, where n is modulo 4 and an integer value m exists such that m·m=n, said dither values being arranged in each of said dither matrices such that each row, column, diagonal and m×m submatrix in each of said dither matrices adds to substantially the same value, each of said dither matrices respectively associated with each of said parameters having dither values that are selected and arranged in each of said dither matrices such that the sum of said dither matrices is a matrix having substantially equal matrix values;

b) for a pixel location having initial data values, accessing the dither values in said dither matrices corresponding to said pixel location;

c) combining each of the initial data values with the corresponding accessed dither values to provide intermediate values;

d) clamping and truncating the intermediate values to provide dithered data values; and e) repeating steps b)–d) for a selected number of pixels in the source image to provide dithered data values representative of an output image.

2. A method for processing data values as defined in claim 1 wherein each row, column, diagonal and m×m submatrix in each of said dither matrices adds to the sum of all dither values in the respective dither matrix divided by n.

3. A method for processing data values as defined in claim 2 wherein n is 4 and m is 2, wherein each of said dither matrices has dither values ranging from 0 to 15 and wherein each row, column, diagonal and 2×2 submatrix in each of said dither matrices adds to 30.

4. A method for processing data values as defined in claim 2 wherein red, green and blue color values are associated with each pixel location and wherein red, green and blue dither matrices are respectively associated with said red, green and blue color values.

5. A method for processing data values as defined in claim 4 wherein n is 4 and m is 2, wherein each row, column, diagonal and 2×2 submatrix in each of said red, green and blue dither matrices adds to 30 and wherein the sum of said red, green and blue dither matrices is a matrix having matrix values of 22 or 23.

6. A method for processing data values as defined in claim 2 wherein red, green, blue and alpha values are associated with each pixel location and wherein red, green, blue and alpha dither matrices are respectively associated with said red, green, blue and alpha values.

7. A method for processing data values as defined in claim 6 wherein n is 4 and m is 2, wherein each row, column, diagonal and 2×2 submatrix in each of said red, green, blue and alpha dither matrices add to 30 and wherein the sum of said red, green, blue and alpha dither matrices is a matrix having matrix values of 30.

8. A method for processing data values as defined in claim 1 wherein said dither matrices are stored in tables and wherein the step of accessing the dither values corresponding to the pixel location comprises addressing the tables with low order bits of the pixel location.

9. A method for processing data values as defined in claim 1 wherein the step of repeating steps b)–d) comprises repeating steps b)–d) for all pixels in the source image.

10. A method for processing data values as defined in claim 1 wherein the step of combining each of the initial data values with the corresponding accessed dither values comprises adding each of the initial data values and the corresponding accessed dither values.

11. Apparatus for processing data values representative of a source image wherein two or more data values, representative of different parameters, are associated with each pixel of the source image, comprising:

memory means for storing dither matrices, one associated with each of said parameters, each of said dither matrices having dither values corresponding to pixel locations in the source image, each of said dither matrices having dimensions n×n, where n is modulo 4 and an integer value m exists such that m·m=n, said dither values being arranged in each of said dither matrices such that each row, column, diagonal and m×m submatrix in each of said dither matrices adds to substantially the same value, each of said dither matrices respectively associated with each of said parameters having dither values that are selected and arranged in each of said dither matrices such that the sum of said dither matrices is a matrix having substantially equal matrix values;

addressing means for addressing the dither values in said memory means corresponding to a pixel location having initial data values;

an adder for adding each of the initial data values and the corresponding dither values to provide intermediate values;

means for clamping and truncating the intermediate values to provide dithered data values; and means for sequencing through a selected number of pixels in the source image and generating dithered data values for each of the selected pixels, wherein said dithered data values are representative of an output image.

12. Apparatus for processing data values as defined in claim 11 wherein each row, column, diagonal and m×m submatrix in each of said dither matrices adds to the sum of all dither values in the respective dither matrix divided by n.

13. Apparatus for processing data values as defined in claim 12 wherein n is 4 and m is 2, wherein each of said dither matrices has dither values ranging from 0 to 15 and wherein each row, column, diagonal and 2×2 submatrix in each of said dither matrices adds to 30.

14. Apparatus for processing data values as defined in claim 11 wherein red, green and blue color values are associated with each pixel location and wherein red, green and blue dither matrices are respectively associated with said red, green and blue color values.

15. Apparatus for processing data values as defined in claim 11 wherein red, green, blue and alpha values are associated with each pixel location and wherein red, green, blue and alpha dither matrices are respectively associated with said red, green, blue and alpha values.

* * * * *